United States Patent
Ji et al.

(10) Patent No.: US 10,198,660 B2
(45) Date of Patent: Feb. 5, 2019

(54) METHOD AND APPARATUS FOR EVENT SAMPLING OF DYNAMIC VISION SENSOR ON IMAGE FORMATION

(71) Applicants: Zhengping Ji, Temple City, CA (US); Qiang Zhang, Pasadena, CA (US); Kyoobin Lee, Gyeonggi-do (KR); Yibing Michelle Wang, Temple City, CA (US); Hyun Surk Ryu, Gyeonggi-do (KR); Ilia Ovsiannikov, Studio City, CA (US)

(72) Inventors: Zhengping Ji, Temple City, CA (US); Qiang Zhang, Pasadena, CA (US); Kyoobin Lee, Gyeonggi-do (KR); Yibing Michelle Wang, Temple City, CA (US); Hyun Surk Ryu, Gyeonggi-do (KR); Ilia Ovsiannikov, Studio City, CA (US)

(73) Assignee: Samsung Electronics Co. Ltd. (KR)

( * ) Notice: Subject to any disclaimer, the term of this patent is extended or adjusted under 35 U.S.C. 154(b) by 115 days.

(21) Appl. No.: 15/076,203

(22) Filed: Mar. 21, 2016

(65) Prior Publication Data

US 2017/0213105 A1  Jul. 27, 2017

Related U.S. Application Data

(60) Provisional application No. 62/287,706, filed on Jan. 27, 2016.

(51) Int. Cl.
*G06K 9/62* (2006.01)
*G06K 9/00* (2006.01)
*G06K 9/46* (2006.01)
*G06K 9/20* (2006.01)

(52) U.S. Cl.
CPC ....... *G06K 9/6202* (2013.01); *G06K 9/00765* (2013.01); *G06K 9/20* (2013.01); *G06K 9/4661* (2013.01); *G06K 9/6276* (2013.01); *G06K 2009/00738* (2013.01)

(58) Field of Classification Search
CPC ...... G06K 9/00624; G06K 9/20; G06K 9/605; G06K 9/6267; G06K 9/6202; G06K 9/00765; G06K 9/4661; G06K 9/6276; G06K 2009/00738
See application file for complete search history.

(56) References Cited

U.S. PATENT DOCUMENTS

| | | |
|---|---|---|
| 6,667,769 B2 | 12/2003 | Harton et al. |
| 8,363,140 B2 | 1/2013 | Heim et al. |
| 8,780,240 B2 | 7/2014 | Posch et al. |

(Continued)

*Primary Examiner* — Nhan T Tran
(74) *Attorney, Agent, or Firm* — The Farrell Law Firm, P.C.

(57) ABSTRACT

An apparatus and a method. The apparatus includes a dynamic vision sensor (DVS) configured to generate a stream of events, where an event includes a location and a binary value indicating a positive or a negative change in luminance; a sampling unit connected to the DVS and configured to sample the stream of events; and an image formation unit connected to the sampling unit and configured to form an image for each sample of the stream of events, wherein a manner of sampling by the sampling unit is adjusted to reduce variations between images formed by the image formation unit.

12 Claims, 5 Drawing Sheets

(56) References Cited

U.S. PATENT DOCUMENTS

| | | | |
|---|---|---|---|
| 2014/0050360 A1* | 2/2014 | Lin | G06K 9/00771 |
| | | | 382/103 |
| 2014/0320706 A1 | 10/2014 | Shin et al. | |
| 2014/0326854 A1 | 11/2014 | Delbruck et al. | |
| 2015/0302710 A1* | 10/2015 | Jin | G06F 3/017 |
| | | | 348/155 |
| 2016/0078001 A1* | 3/2016 | Wang | G06F 17/141 |
| | | | 708/405 |
| 2016/0078321 A1* | 3/2016 | Wang | G06K 9/6267 |
| | | | 382/103 |
| 2016/0093273 A1* | 3/2016 | Wang | G01S 3/781 |
| | | | 345/428 |

* cited by examiner

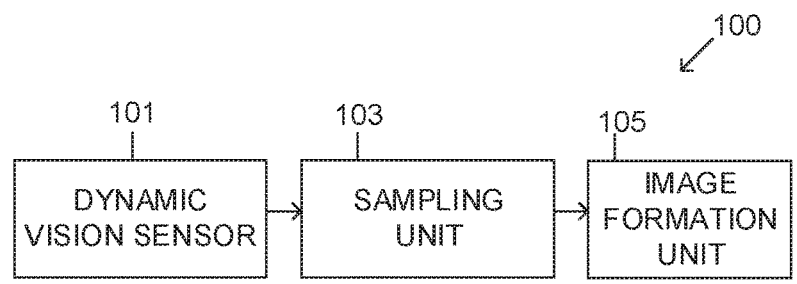
FIG. 1
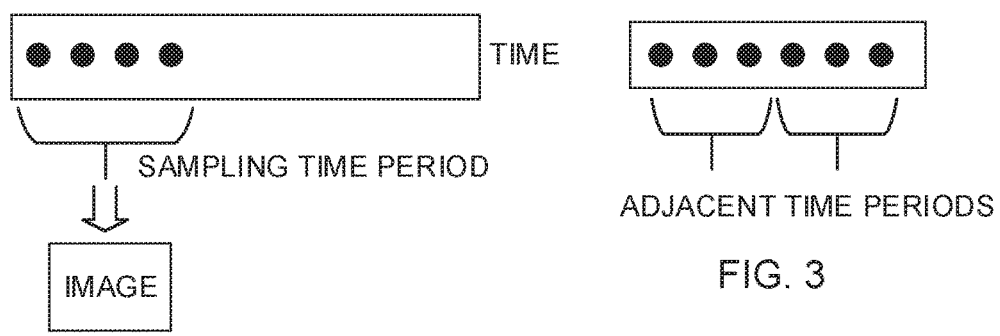
FIG. 2
FIG. 3
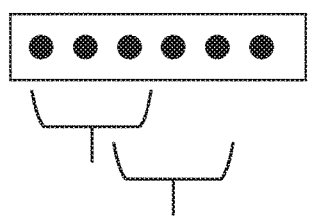
OVERLAPPING TIME
PERIODS
FIG. 4
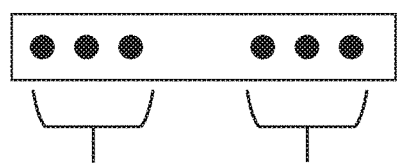
DISJOINTED TIME PERIODS
FIG. 5

METHOD AND APPARATUS FOR EVENT SAMPLING OF DYNAMIC VISION SENSOR ON IMAGE FORMATION

PRIORITY

This application claims priority under 35 U.S.C. § 119(e) to a U.S. Provisional Patent Application filed on Jan. 27, 2016 in the United States Patent and Trademark Office and assigned Ser. No. 62/287,706, the entire contents of which are incorporated herein by reference.

FIELD

The present disclosure relates generally to an apparatus for and a method of event sampling of a dynamic vision sensor (DVS), and more particularly, to an apparatus for and a method of event sampling of a DVS to produce images with reduced variations between the images.

BACKGROUND

A conventional vision sensor captures a scene as a sequence of pictures or frames that are taken at a certain rate (e.g., a frame rate), where every picture element (e.g., pixel) within the boundary of a frame is captured in the frame. Pixel information that does not change from one frame to another frame is redundant information. Storing and processing redundant information wastes storage space, processing time, and battery power.

A DVS does not capture a scene in frames, but functions similarly to a human retina. That is, a DVS transmits only a change in a pixel's luminance (e.g., an event) at a particular location within a scene at the time of the event.

An output of a DVS is a stream of events, where each event is associated with a particular state, i.e., a location of the event within a camera array and a binary state indicating a positive or a negative change in the luminance of the associated event as compared to an immediately preceding state of the associated location.

SUMMARY

According to one embodiment, an apparatus includes a DVS configured to generate a stream of events, where an event includes a location and a binary value indicating a positive or a negative change in luminance; a sampling unit connected to the DVS and configured to sample the stream of events; and an image formation unit connected to the sampling unit and configured to form an image for each sample of the stream of events.

According to one embodiment, a method includes generating a stream of events by a DVS, where an event includes a location and a binary value indicating a positive or a negative change in luminance; sampling the stream of events by a sampling unit connected to the DVS; and forming an image for each sample of the stream of events by an image formation unit connected to the sampling unit.

According to one embodiment, an apparatus includes a DVS configured to generate a stream of events, where an event includes a location and a binary value indicating a positive or a negative change in luminance; a sampling unit connected to the DVS and configured to sample the stream of events; an inertial measurement unit (IMU) co-located with the DVS and configured to measure an acceleration of the DVS in the x-axis, the y-axis, and the z-axis, and including an output connected to the sampling unit; and an image formation unit connected to the sampling unit and configured to form an image for each sample of the stream of events, wherein a manner of sampling by the sampling unit is adjusted to reduce variations between images formed by the image formation unit.

According to one embodiment, a method includes generating a stream of events by a DVS, where an event includes a location and a binary value indicating a positive or a negative change in luminance; sampling the stream of events by a sampling unit connected to the DVS; determining an acceleration of the DVS in an x-axis, a y-axis, and a z-axis direction by an IMU co-located with the DVS; and forming an image for each sample of the stream of events by an image formation unit connected to the sampling unit, wherein a manner of sampling by the sampling unit is adjusted based on a predetermined sampling condition.

According to one embodiment, an apparatus includes a dynamic vision sensor (DVS) configured to generate a stream of events, where an event includes a location and a binary value indicating a positive or a negative change in luminance; a sampling unit connected to the DVS and configured to sample the stream of events; an image formation unit connected to the sampling unit and configured to form a first image and a second image from two samples of the stream of events; an image alignment unit connected to the image formation unit and configured to align the first image and the second image; and an image comparison unit including an input connected to the image alignment unit and an output connected to the sampling unit, wherein a manner of sampling by the sampling unit is adjusted to reduce variations between images based on a comparison of the first image and the second image by the image comparison unit.

According to one embodiment, a method includes generating a stream of events by a dynamic vision sensor (DVS), where an event includes a location and a binary value indicating a positive or a negative change in luminance; sampling the stream of events by a sampling unit connected to the DVS; forming a first image and a second image from two samples of the stream of events by an image formation unit connected to the sampling unit; aligning the first image and the second image by an image alignment unit connected to the image formation unit; and comparing the first image and the second image by an image comparison unit connected to the image alignment unit and the sampling unit, wherein a manner of sampling by the sampling unit is adjusted to reduce variations between images based on a result of the comparison.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 1 is a block diagram of an apparatus for reducing variations in images formed from DVS events, according to an embodiment of the present disclosure;

FIG. 2 is an illustration of a sampling period used in forming an image from DVS events, according to an embodiment of the present disclosure;

FIG. 3 is an illustration of adjacent samples of equal time periods used in forming an image from DVS events, according to an embodiment of the present disclosure;

FIG. 4 is an illustration of overlapping samples of equal time periods used in forming an image from DVS events, according to an embodiment of the present disclosure;

FIG. 5 is an illustration of disjointed samples of equal time periods used in forming an image from DVS events, according to an embodiment of the present disclosure;

DETAILED DESCRIPTION OF EMBODIMENTS OF THE PRESENT DISCLOSURE

Figure 6:
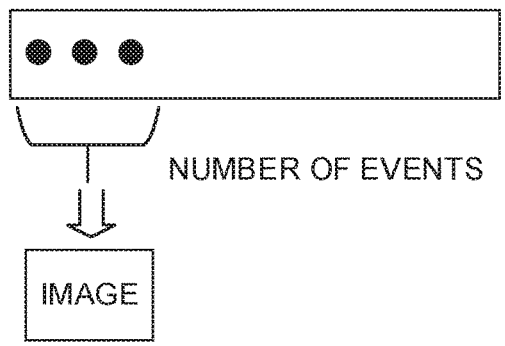
FIG. 6 is an illustration of a sample of a number of events used in forming an image from DVS events, according to an embodiment of the present disclosure.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

In embodiments of the present disclosure an apparatus for and a method of event sampling of a DVS are provided. To utilize a DVS for certain tasks (e.g., visual recognition, simultaneous localization and mapping (SLAM), pattern recognition, scene understanding, gesture recognition for gesture based user-device interaction (e.g., television (TV), game), user recognition (e.g., for TV, mobile device), and robotics), a DVS stream must be converted to an image to reflect structural patterns in an environment. A stream of DVS events (e.g., an event stream) is sampled in a manner to generate images with reduced variations therebetween. Reducing variations in images generated from an event stream benefits image-based tasks.

Sampling of a stream of events generated by a DVS may be based on a predetermined time interval, a predetermined number of events, or a combination thereof. However, such sampling methods may not perform well if there is a dynamic change in the movement of the DVS and/or objects within a scene, because motion representation is sensitive to local changes, biases, and noise. In addition, an estimate of motion from an event stream may not accurately represent the movement of a DVS. Furthermore, transforming local motion to a global DVS movement is difficult in practice. For example, two adjacent images may be more applicable for making a short-term adjustment than for making a long-term adjustment.

The present disclosure concerns an apparatus and a method of sampling an event stream generated by a DVS to reduce variations between images produced and benefit image based tasks.

FIG. 1 is a block diagram of an apparatus for reducing variations in images formed from DVS events, according to an embodiment of the present disclosure.

Referring to FIG. 1, the apparatus 100 includes a DVS 101, a sampling unit 103, and an image formation unit 105.

The DVS 101 captures a change in pixel luminance (e.g., an event) within a scene and outputs a stream of events, where each event has a state. The state of an event includes a location of the event within a camera array and a binary value indicating either a positive or a negative change in the luminance of the associated event as compared to an immediately preceding state of the associated location.

The sampling unit 103 includes an input connected to the output of the DVS 101 for receiving a stream of events from the DVS 101, and an output for outputting samples of the event stream. The sampling unit 103 may sample an event stream based on a time period, a number of events, or a combination thereof. The sampling unit 103 includes an output for outputting samples of an event stream to the image formation unit 105.

The image formation unit 105 includes an input connected to the output of the sampling unit 103 for receiving samples of an event stream. The image formation unit 105 forms an image from each sample of an event stream and outputs an image for each sample of an event stream. An image output by the image formation unit 105 may be used in an application or application unit that requires an image (e.g., visual recognition, simultaneous localization and mapping (SLAM), pattern recognition, scene understanding, gesture recognition for gesture based user-device interaction (e.g., television (TV), game), user recognition (e.g., for TV, mobile device), and robotics).

The DVS 101 may move. The faster the DVS 101 moves the more events it may capture and include in an event stream. The more events in an event stream the more events that may be included in a sample of an event stream. The more events in a sample of an event stream the more variations that may occur between images formed from samples of an event stream. An application or application unit that uses images that include more variations therebetween may experience a degradation in performance. Thus, there is a need for an apparatus for and a method of reducing variations in images formed from samples of an event stream.

FIG. 2 is an illustration of a sampling time period used in forming an image from DVS events, according to an embodiment of the present disclosure. Sampling periods may be adjacent, overlapping, or disjointed.

Referring to FIG. 2, a predetermined time period is used to sample an event stream. All of the events that occur within a predetermined time period are included in a sample of an event stream. However, there are some issues associated with a predetermined time period for sampling an event stream. A first issue is when the DVS 101 moves fast. If the DVS 101 moves fast, then more variations may occur between images formed from samples of an event stream, which may degrade the performance of an application or application unit that uses the images. A second issue is when the DVS 101 moves slow or not at all. If the DVS 101 moves slow or not at all, then there may not be a sufficient number of events included in a sample of an event stream to form an adequate image.

FIG. 3 is an illustration of adjacent samples of equal time periods used in forming an image from DVS events, according to an embodiment of the present disclosure.

FIG. 4 is an illustration of overlapping samples of equal time periods used in forming an image from DVS events, according to an embodiment of the present disclosure.

FIG. 5 is an illustration of disjointed samples of equal time periods used in forming an image from DVS events, according to an embodiment of the present disclosure.

In an embodiment of the present disclosure, an event stream may be sampled to include a predetermined number of events.

FIG. 6 is an illustration of a sample of a number of events used in forming an image from DVS events, according to an embodiment of the present disclosure. Samples of a predetermined number of events may be adjacent, overlapping, or disjointed. Each sample of an event stream includes a predetermined number of events, no matter how much or how little time it takes for the number of events to occur.

Figure 7:
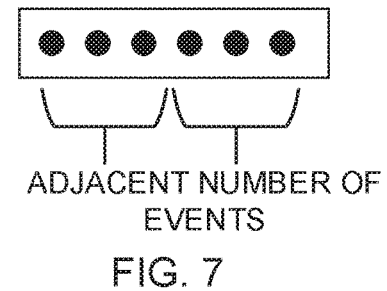
FIG. 7 is an illustration of adjacent samples of equal numbers of events used in forming an image from DVS events, according to an embodiment of the present disclosure.

FIG. 7 is an illustration of adjacent samples of equal numbers of events used in forming an image from DVS events, according to an embodiment of the present disclosure.

Figure 8:
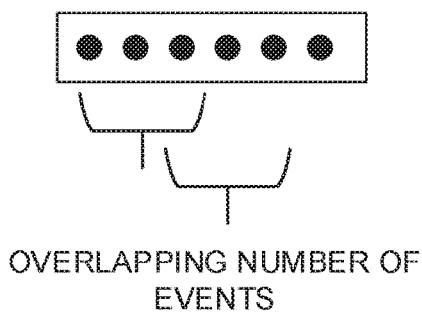
FIG. 8 is an illustration of overlapping samples of equal numbers of events used in forming an image from DVS events, according to an embodiment of the present disclosure.

FIG. 8 is an illustration of overlapping samples of equal numbers of events used in forming an image from DVS events, according to an embodiment of the present disclosure.

Figure 9:
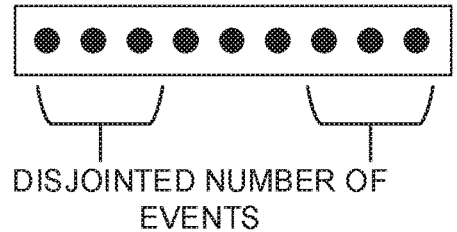
FIG. 9 is an illustration of disjointed samples of equal numbers of events used in forming an image from DVS events, according to an embodiment of the present disclosure.

FIG. 9 is an illustration of disjointed samples of equal numbers of events used in forming an image from DVS events, according to an embodiment of the present disclosure.

In an embodiment of the present disclosure, an event stream may be sampled in a combination of both a time period and a number of events (e.g., an event may be at least n events that occur within a certain period of time).

Figure 10:
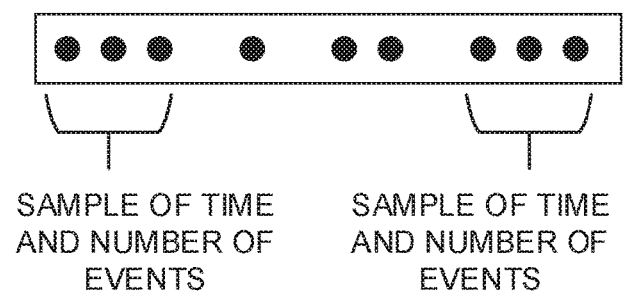
FIG. 10 is an illustration of a sample based on a combination of a sampling period and a number of events used in forming an image from DVS events, according to an embodiment of the present disclosure.

FIG. 10 is an illustration of a sample based on a combination of a sampling period and a number of events used in forming an image from DVS events, according to an embodiment of the present disclosure.

Referring to FIG. 10, an event stream is only sampled when at least a predetermined number of events are present in the event stream within a predetermined time period. If at least a predetermined number of events are not present within a predetermined time period, the event stream is not sampled during the time period. The number of events per sample may be used to estimate the speed of the DVS 101 based on the density of events in the samples (e.g., the number of events per elapsed time). The time period for sampling may be adjusted according to the event density to reduce variation in images formed from samples of an event stream. Samples of a combination of sampling period and a number of events may be adjacent, overlapping, or disjointed.

Figure 11:
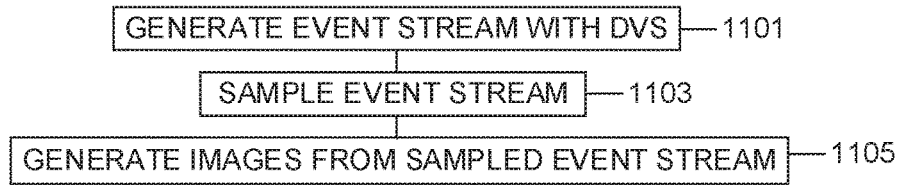
FIG. 11 is a flowchart of a method of reducing variations in images formed from DVS events, according to an embodiment of the present disclosure.

FIG. 11 is a flowchart of a method of reducing variations in images formed from DVS events, according to an embodiment of the present disclosure.

Referring to FIG. 11, an event stream is generated by a DVS (e.g., the DVS 101 of FIG. 1) in 1101.

In 1103, the event stream is sampled in a manner by a sampling unit (e.g., the sampling unit 103 of FIG. 1). The event stream may be sampled using a predetermined time period, a predetermined number of events, or a combination thereof. A time period and a number of events may be combined in various ways to provide adaptiveness and reduce variations between images formed (e.g., minimum of a predetermined time period and a predetermined number of events, a predetermined number of events divided by a predetermined time period, etc.). Samples may be adjacent, overlapping, or disjointed.

In 1105, an image is generated for each sample.

Figure 12:
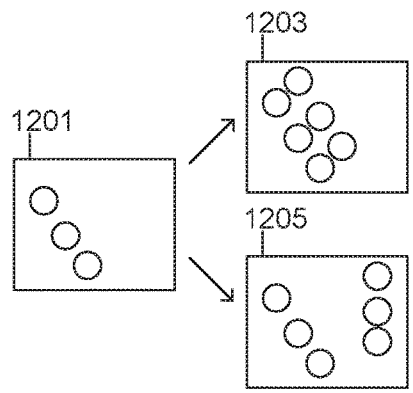
FIG. 12 is an illustration of a first image generated by a DVS, a second image generated by a DVS that moves fast, and a DVS generated third image that includes a new object, according to an embodiment of the present disclosure.

FIG. 12 is an illustration of a first image 1201 generated by a DVS, a second image 1203 generated by a DVS that moves fast, and a DVS generated third image 1205 that includes a new object, according to an embodiment of the present disclosure.

Referring to FIG. 12, the first image 1201 may be an image that may not degrade the performance of an application or application unit that requires an image. The second image 1203 illustrates an image generated based on a sample of an event stream that includes events captured when a DVS moves fast, as indicated by what appears to be two copies of the pattern of events in the first image 1201 that are spaced closely in time and have the same orientation as the pattern of events in the first image 1201. Since the number of variations between the first image 1201 and the second image 1203 may degrade an application or application unit that uses the first image 1201 and the second image 1203, there is a need for an apparatus for and a method of identifying when a DVS moves fast and adjusting a sampling manner accordingly to reduce variations between images.

In addition, the third image 1205 includes two patterns of events, where one of the patterns of events is the same as the pattern of events in the first image 1201 and a pattern of events that has a different orientation than the pattern of events in the first image 1201 and is spaced far apart from the other pattern. This may indicate that the third image includes an edge/object that is not in the first image 1201. Thus, there is a need for an apparatus for and a method of distinguishing between images that indicate a fast moving DVS and an introduction of a new edge/object in an image, because events associated with a fast moving DVS may be used to adjust a sampling manner, whereas events associated with a new edge/object may not.

Figure 13:
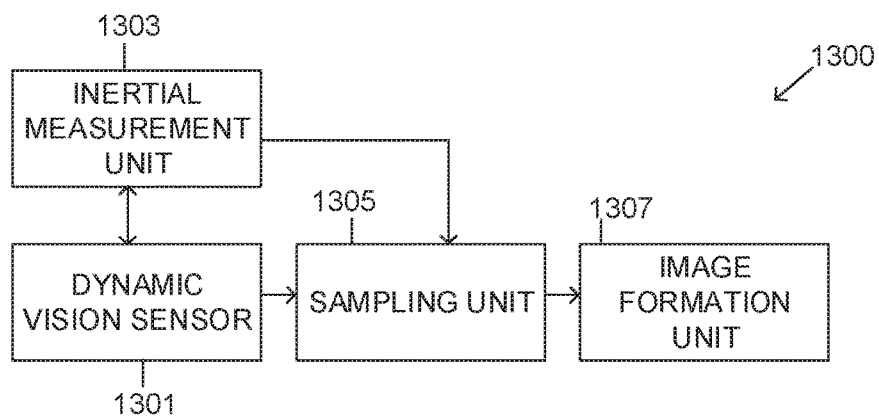
FIG. 13 is a block diagram of an apparatus for reducing variations in images formed from DVS events by determining a speed of a DVS, according to an embodiment of the present disclosure.

FIG. 13 is a block diagram of an apparatus 1300 for reducing variations in images formed from DVS events by determining a speed of a DVS, according to an embodiment of the present disclosure.

Referring to FIG. 13, the apparatus 1300 includes a DVS 1301, an inertial measurement unit (IMU) 1303, a sampling unit 1305, and an image formation unit 1307.

The DVS 1301 captures a change in pixel luminance (e.g., an event) within a scene and outputs a stream of events, where each event has a state. The state of an event includes a location of the event within a camera array and a binary value indicating either a positive or a negative change in the luminance of the associated event as compared to an immediately preceding state of the associated location.

The IMU 1303 is co-located with the DVS 1301 (e.g., next to each other, not next to each other, but on the same device so that the IMU and the DVS move at the same speed) so that an accelerations in an x-axis, a y-axis, and a z-axis measured by the IMU 1303 represents an acceleration in an x-axis, a y-axis, and a z-axis of the DVS 1301. The IMU 1303 includes an output for outputting the representation of the acceleration in the x-axis, a y-axis, and a z-axis of the DVS 1301.

The sampling unit 1305 includes a first input connected to the output of the DVS 1301 for receiving a stream of events from the DVS 1301, a second input connected to the output of the IMU 1303 for receiving the representation of the accelerations in the x-axis, a y-axis, and a z-axis of the DVS 1301, and an output for outputting samples of the event stream. The sampling unit 1305 may sample an event stream based on a time period, a number of events, or a combination thereof, where the sampling manner of the sampling unit 1305 is adjusted according to the output of the IMU 1303. The sampling unit 1305 includes an output for outputting samples of an event stream.

The image formation unit 1307 includes an input connected to the output of the sampling unit 1305 for receiving samples of an event stream. The image formation unit 1307 forms an image from each sample of an event stream and outputs an image for each sample of an event stream. An image output by the image formation unit 1307 may be used in an application or an application unit that requires an image (e.g., visual recognition, SLAM, pattern recognition, scene understanding, gesture recognition for gesture based user-device interaction (e.g., television (TV), game), user recognition (e.g., for TV, mobile device), and robotics).

Figure 14:
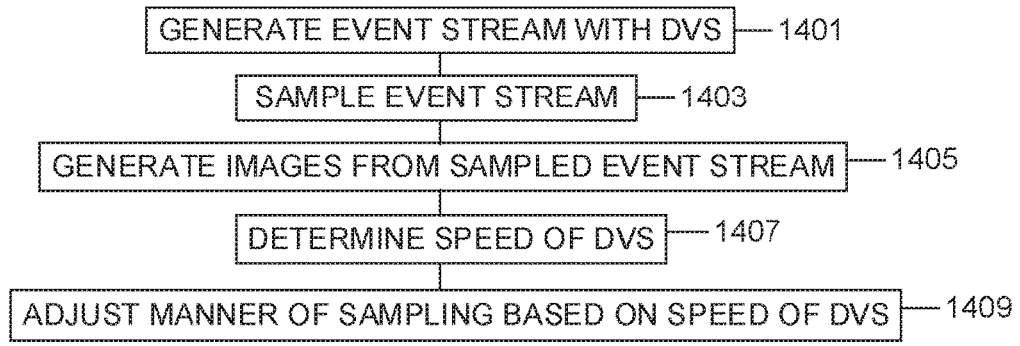
FIG. 14 is a flowchart of a method of reducing variations in images formed from DVS events by determining a speed of a DVS, according to an embodiment of the present disclosure.

FIG. 14 is a flowchart of a method of reducing variations in images formed from DVS events by determining a speed of a DVS, according to an embodiment of the present disclosure.

Referring to FIG. 14, an event stream is generated by a DVS (e.g., the DVS 1301 of FIG. 13) in 1401.

In 1403, the event stream is sampled in a manner by a sampling unit (e.g., the sampling unit 1305 of FIG. 13). The event stream may be sampled using a predetermined time period, a predetermined number of events, or a combination thereof. Samples may be adjacent, overlapping, or disjointed.

In 1405, an image is generated for each sample.

In 1407, a speed of the DVS is determined by an inertial measurement unit.

In 1409, the manner of sampling is adjusted according to the speed of the DVS to reduce a variation between images. The speed of the DVS may be determined at times close in time or farther apart in time. The speed of the DVS determined close in time may be used to provide robustness in the short term, whereas the speed of the DVS determined farther apart in time may be used to provide robustness in the long term.

Figure 15:
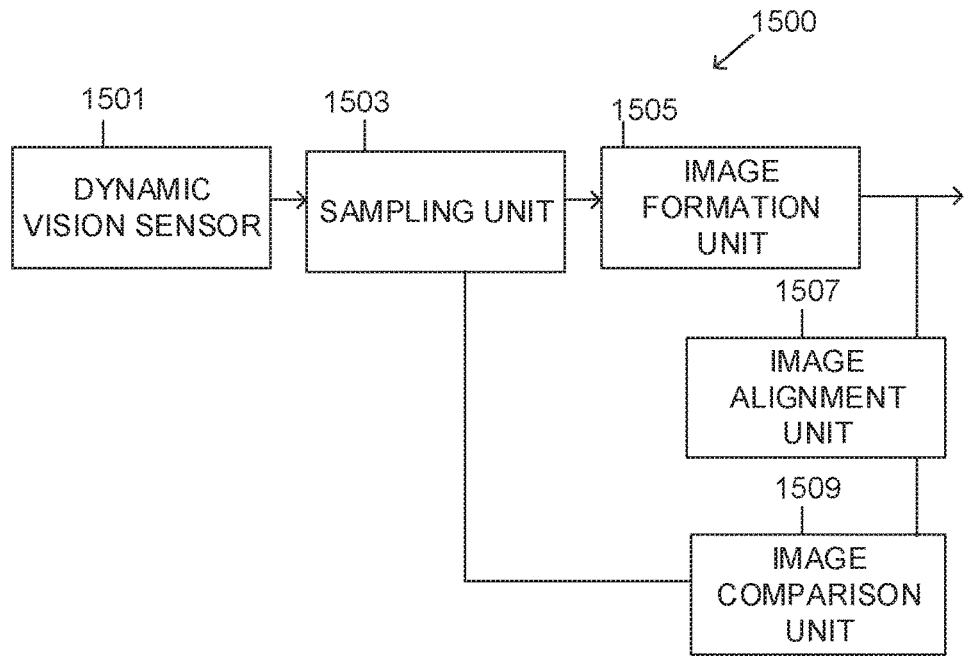
FIG. 15 is a block diagram of an apparatus for reducing variations in images formed from DVS events by comparing formed images, according to an embodiment of the present disclosure.

FIG. 15 is a block diagram of an apparatus 1500 for reducing variations in images formed from DVS events by comparing formed images, according to an embodiment of the present disclosure.

Referring to FIG. 15, the apparatus 1500 includes a DVS 1501, a sampling unit 1503, an image formation unit 1505, an image alignment unit 1507, and an image comparison unit 1509.

The DVS 1501 captures a change in pixel luminance (e.g., an event) within a scene and outputs a stream of events, where each event has a state. The state of an event includes a location of the event within a camera array and a binary value indicating either a positive or a negative change in the luminance of the associated event as compared to an immediately preceding state of the associated location.

The sampling unit 1503 includes a first input connected to the output of the DVS 1501 for receiving a stream of events from the DVS 1501, a second input for adjusting a sampling manner of the sampling unit 1503, and an output for outputting samples of the event stream. The sampling unit 1503 may sample an event stream based on a time period, a number of events, or a combination thereof. The sampling unit 1503 includes an output for outputting samples of an event stream. For the first two samples, the sampling manner may be the same, because at least two images may be needed before an adjustment to the manner of sampling may be made. Thereafter, the sampling manner may be different for the next sample.

The image formation unit 1505 includes an input connected to the output of the sampling unit 1503 for receiving samples of an event stream. The image formation unit forms an image from each sample of an event stream and outputs an image for each sample of an event stream. The images formed for the first two samples are formed on the basis of the same manner of sampling, because at least two images may be needed before an adjustment to the manner of sampling may be made. Thereafter, each subsequent image may be formed on the basis of a different manner of sampling than the immediately preceding manner of sampling. An image output by the image formation unit 1505 may be used in an application or application unit that requires an image (e.g., visual recognition, simultaneous localization and mapping (SLAM), pattern recognition, scene understanding, gesture recognition for gesture based user-device interaction (e.g., television (TV), game), user recognition (e.g., for TV, mobile device), and robotics).

The image alignment unit 1507 includes an input connected to the output of the image formation unit 1505, and an output for outputting two images (e.g., a first image and a second image) formed by the image formation unit 1505 that are aligned or registered for comparison purposes. The two images may be adjacent images produced by the image formation unit 1505 or may be images generated by the image formation unit 1505 that are disjointed in time, where adjacent images provide robustness in the short term, and where disjointed images provide robustness in the long term.

The image comparison unit 1509 includes an input connected to the output of the image alignment unit 1507 and an output connected to the second input of the sampling unit 1503. The image comparison unit 1509 compares the two images output by the image alignment unit 1507 and determines whether events in the two images match (e.g., share the same location). Matched events are referred to as reference events, and the number of matched events R is determined.

For the first image, the image comparison unit 1509 determines a number of events $N_1$ in the first image that are within a predetermined neighborhood of the reference events. Then, for the second image, the image comparison unit 1509 determines a number of events $N_2$ in the second image that are within the predetermined neighborhood of the reference events.

The image comparison unit 1509 then calculates $(R+N_1)/(R+N_2)$. If $(R+N_1)/(R+N_2)$ is greater than a predetermined threshold T or is less than $1/T$, the image comparison unit 1509 outputs a signal to the sampling unit 1503 to adjust the sampling manner accordingly. That is, if $(R+N_1)/(R+N_2)>T$, then that indicates that there are more events within the neighborhood of the reference events in the first image than the second image (i.e., the number of neighboring events is decreasing, which indicates that the speed of the DVS is decreasing) and that the sampling manner may be reduced (e.g., reduce the sampling period, reduce the predetermined number of events in a sample, or reduce a combination of sampling period and number of events). If $(R+N_1)/(R+N_2)<1/T$, then that indicates that there are more events within the neighborhood of the reference events in the second image than the first image (i.e., the number of neighboring events is increasing, which indicates that the speed of the DVS is increasing) and that the sampling manner may be increased (e.g., increase the sampling period, increase the predetermined number of events in a sample, or increase a combination of sampling period and number of events). Note that events due to a new edge/object in an image are not used to determine an adjustment of the manner of sampling, because they would not appear within the predetermined neighborhood of the reference events. If $1/T<(R+N_1)/(R+N_2)<T$, the image comparison unit 1509 does not output a signal to the sampling unit 1503 to adjust the sampling manner accordingly (i.e., the current manner of sampling is maintained).

Figure 16:
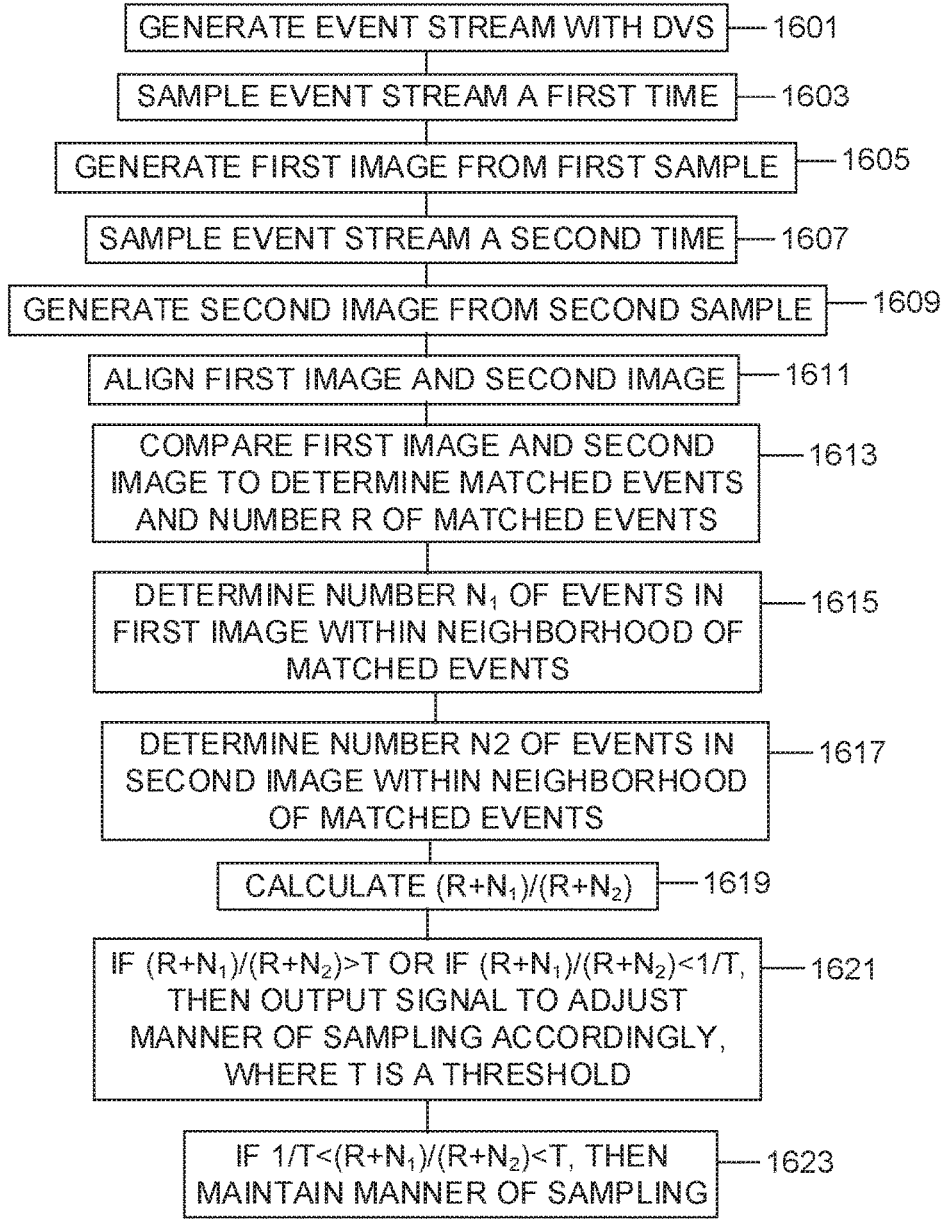
FIG. 16 is a flowchart of a method of reducing variations in images formed from DVS events by comparing formed images, according to an embodiment of the present disclosure.

FIG. 16 is a flowchart of a method of reducing variations in images formed from DVS events by comparing formed images, according to an embodiment of the present disclosure.

Referring to FIG. 16, an event stream is generated by a DVS (e.g., the DVS 1501 of FIG. 15) in 1601.

In 1603, the event stream is sampled a first time in a manner by a sampling unit (e.g., the sampling unit 1503 of FIG. 15). The event stream may be sampled using a predetermined time period, a predetermined number of events, or a combination thereof. Samples, may be adjacent, overlapping, or disjointed.

In 1605, a first image is generated for the first sample by an image formation unit (e.g., the image formation unit 1505 of FIG. 15).

In 1607, the event stream is sampled a second time in a manner by the sampling unit. If the second sample occurs after the very first sample then the manner of sampling is the same as for the very first sample. Thereafter, the manner of sampling may be different from the immediately previous manner of sampling. The event stream may be sampled using a predetermined time period, a predetermined number of events, or a combination thereof. Samples may be adjacent, overlapping, or disjointed.

In 1609, a second image is generated for the second sample by the image formation unit.

In 1611, the first image and the second image are aligned or registered by an image alignment unit (e.g., the image alignment unit 1507 of FIG. 15). The two images may be adjacent images produced by the image formation unit or may be images generated by the image formation unit that are disjointed in time, where adjacent images provide robustness in the short term, and where disjointed images provide robustness in the long term.

In 1613, the first image and the second image are compared by an image comparison unit (e.g., the image comparison unit 1509 of FIG. 15) to determine whether events in the two images match (e.g., share the same location) and, if so, a number of matched events R. Matched events are referred to as reference events.

In 1615, the image comparison unit determines for the first image a number of events $N_1$ in the first image, that did not match with events in the second image, that are within a predetermined neighborhood of the reference events.

In 1617, the image comparison unit determines for the second image a number of events $N_2$ in the second image, that did not match with events in the first image, that are within a predetermined neighborhood of the reference events.

In 1619, the image comparison unit calculates $(R+N_1)/(R+N_2)$.

In 1621, if $(R+N_1)/(R+N_2)$ is greater than a predetermined threshold T or is less than $1/T$, the image comparison unit outputs a signal to the sampling unit to adjust the sampling manner accordingly. That is, if $(R+N_1)/(R+N_2)>T$, then that indicates that there are more events within the neighborhood of the reference events in the first image than the second image (i.e., the number of neighboring events is decreasing, which indicates that the speed of the DVS is decreasing) and that the sampling manner may be reduced (e.g., reduce the sampling period, reduce the predetermined number of events in a sample, or reduce a combination of sampling period and number of events). If $(R+N_1)/(R+N_2)<1/T$, then that indicates that there are more events within the neighborhood of the reference events in the second image than the first image (i.e., the number of neighboring events is increasing, which indicates that the speed of the DVS is increasing) and that the sampling manner may be increased (e.g., increase the sampling period, increase the predetermined number of events in a sample, or increase a combination of sampling period and number of events). Note that events due to a new edge/object in an image are not used to determine an adjustment of the manner of sampling, because they would not appear within the predetermined neighborhood of the reference events.

In 1623, if $1/T<(R+N_1)/(R+N_2)<T$, the image comparison unit maintains the sampling manner of the sampling unit.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
   a dynamic vision sensor (DVS) configured to generate a stream of events, where an event includes a location and a binary value indicating a positive or a negative change in luminance;
   a sampling unit connected to the DVS and configured to sample the stream of events;
   an inertial measurement unit (IMU) co-located with the DVS and configured to measure an acceleration of the DVS in three directions, and including an output connected to the sampling unit; and
   an image formation unit connected to the sampling unit and configured to form an image for each sample of the stream of events.

2. The apparatus of claim 1, wherein the manner of sampling is one of a predetermined time period, a predetermined number of events, or a combination thereof.

3. The apparatus of claim 2, wherein the predetermined time period, the predetermined number of events, or the combination thereof may each be adjacent, overlapping, or disjointed.

4. A method, comprising:
   generating a stream of events by a dynamic vision sensor (DVS), where an event includes a location and a binary value indicating a positive or a negative change in luminance;
   sampling the stream of events by a sampling unit connected to the DVS;
   measuring an acceleration of the DVS in three directions by an inertial measurement unit (IMU) co-located with the DVS, and outputting said measured acceleration signal to the sampling unit; and
   forming an image for each sample of the stream of events by an image formation unit connected to the sampling unit.

5. The method of claim 4, wherein the manner of sampling is one of a predetermined time period, a predetermined number of events, or a combination thereof.

6. The method of claim 5, wherein the predetermined time period, the predetermined number of events, or the combination thereof may each be adjacent, overlapping, or disjointed.

7. An apparatus, comprising:
   a dynamic vision sensor (DVS) configured to generate a stream of events, where an event includes a location and a binary value indicating a positive or a negative change in luminance;
   a sampling unit connected to the DVS and configured to sample the stream of events;
   an inertial measurement unit (IMU) co-located with the DVS and configured to measure an acceleration of the DVS in three directions, and including an output connected to the sampling unit; and
   an image formation unit connected to the sampling unit and configured to form an image for each sample of the stream of events, wherein a manner of sampling by the sampling unit is adjusted to reduce variations between images formed by the image formation unit.

8. The apparatus of claim 7, wherein the manner of sampling is one of a predetermined time period, a predetermined number of events, or a combination thereof, wherein the predetermined time period, the predetermined number of events, or the combination thereof may each be adjacent, overlapping, or disjointed.

9. The apparatus of claim 7, wherein the manner of sampling is decreased if a number of variations between images formed by the image formation unit increases and increases the manner of sampling if the number of variations between images formed by the image formation unit decreases.

10. A method, comprising:
    generating a stream of events by a dynamic vision sensor (DVS), where an event includes a location and a binary value indicating a positive or a negative change in luminance;
    sampling the stream of events by a sampling unit connected to the DVS;
    determining an acceleration of the DVS in three directions by an inertial measurement unit (IMU) co-located with the DVS; and
    forming an image for each sample of the stream of events by an image formation unit connected to the sampling unit, wherein a manner of sampling by the sampling unit is adjusted based on a predetermined sampling condition.

11. The method of claim 10, wherein the manner of sampling is one of a predetermined time period, a predetermined number of events, or a combination thereof, wherein the predetermined time period, the predetermined number of events, or the combination thereof may each be adjacent, overlapping, or disjointed.

12. The method of claim 10, further comprising decreasing the manner of sampling if a number of variations between images formed by the image formation unit increases and increases the manner of sampling if the number of variations between images formed by the image formation unit decreases.

* * * * *